United States Patent [19]

Suzuki

[11] Patent Number: 5,213,012
[45] Date of Patent: May 25, 1993

[54] DOWNSHIFT WITH POWER IN CONTINUOUSLY VARIABLE TRANSMISSION

[75] Inventor: Yutaka Suzuki, Atsugi, Japan

[73] Assignee: Nissan Motor Company, Yokohama, Japan

[21] Appl. No.: 739,761

[22] Filed: Aug. 2, 1991

[30] Foreign Application Priority Data

Aug. 2, 1990 [JP] Japan ................. 2-205388

[51] Int. Cl.$^5$ ................. B60K 41/14; B60K 41/12
[52] U.S. Cl. ................. 74/866; 74/867; 364/424.1
[58] Field of Search ................. 74/866, 867; 364/424.1

[56] References Cited

U.S. PATENT DOCUMENTS

| | | | |
|---|---|---|---|
| 4,735,113 | 4/1988 | Yamamuro et al. | 74/866 |
| 4,743,223 | 5/1988 | Tokoro et al. | 74/856 X |
| 4,771,656 | 9/1988 | Itoh et al. | 74/866 |
| 4,853,858 | 8/1989 | Kumura | 364/424.1 |
| 4,956,972 | 9/1990 | Sasajima et al. | 74/866 X |
| 4,999,774 | 3/1991 | Tokoro et al. | 74/866 X |
| 5,042,324 | 8/1991 | Suzuki | 74/866 X |
| 5,042,326 | 8/1991 | Hibi et al. | 74/866 |
| 5,046,177 | 9/1991 | Vahabzadeh | 74/866 X |
| 5,047,937 | 9/1991 | Vahabzadeh et al. | 74/866 X |
| 5,067,372 | 11/1991 | Suzuki | 74/866 |
| 5,073,859 | 12/1991 | Suzuki | 364/424.1 |
| 5,075,860 | 12/1991 | Suzuki | 364/424.1 |
| 5,099,719 | 3/1992 | Hibi et al. | 74/866 |

*Primary Examiner*—Leslie A. Braun
*Assistant Examiner*—David E. Henn
*Attorney, Agent, or Firm*—Foley & Lardner

[57] ABSTRACT

The present invention relates to a method of and a system for controlling a reduction ratio in a continuously variable transmission. An actuator for controlling the reduction ratio is controlled in response to an output signal. Normally, there is set as the output signal a sum of a feedback value of a deviation between a target value and an actual value of a turbine revolution, i.e., a revolution speed of an input shaft of the continuously variable transmission, and a feedforward value of the deviation. However, in the present arrangement, the feedback value is neglected and the feedforward value only is set as the output signal when there is a demand for a downshift with power.

9 Claims, 8 Drawing Sheets

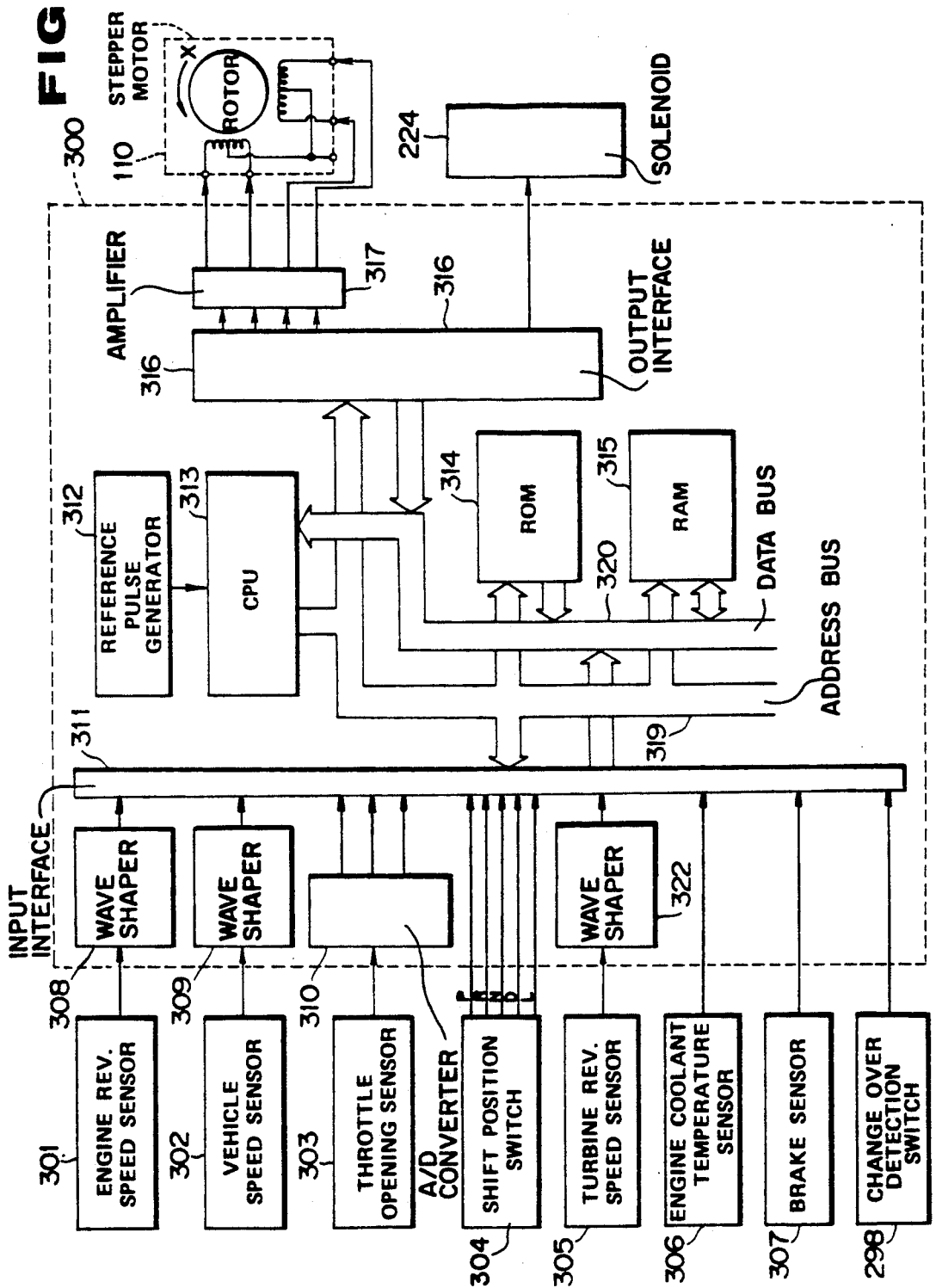

DOWNSHIFT WITH POWER IN CONTINUOUSLY VARIABLE TRANSMISSION

RELATED PATENT AND APPLICATION

U.S. Pat. No. 4,735,113 issued on Apr. 5, 1988 to Yamamuro et al;
U.S. Pat. No. 4,853,858 issued on Aug. 1, 1989 to Kumura; and
U.S. patent application Ser. No. 07/563,309 filed on Aug. 7, 1990 by the applicant, now U.S. Pat. No. 5,067,372 issued on Nov. 26, 1991 to applicant.

BACKGROUND OF THE INVENTION

The present invention relates to a reduction ratio control in a continuously variable transmission drivingly connected to an engine of a vehicle having an accelerator manually operable by a driver of the vehicle.

A continuously variable transmission is known which has a stepper motor as an actuator and hydraulic arrangement for varying a reduction ratio in the transmission from one ratio state to another ratio state in a continuous manner in correspondance with one operating position and another operating position taken by the stepper motor. The stepper motor is controlled in response to an output signal generated by a control unit. It is known to control the continuously variable transmission in a feedback or closed loop manner based on a deviation between an actual value of a turbine (or input) revolution speed and a target value of the turbine revolution speed by controlling the operating position of the stepper motor in such a direction as to reduce the deviation toward zero. According to this known control, it has been experienced that during downshift with power, an increase in output torque does not occur quickly, resulting in a sluggish response to the driver's power demand.

An object of the present invention is to improve a reduction ratio control such that an output torque increase takes place at an appropriate timing in response to a driver's power demand during downshift with power.

SUMMARY OF THE INVENTION

According to one aspect of the present invention, there is provided a method of controlling a reduction ratio control in a continuously variable transmission drivingly connected to an engine of a vehicle having an accelerator manually operable by a driver of the vehicle, the continuously variable transmission having an actuator movable from a first operating position to a second operating position and hydraulic means for varying the reduction ratio from a first ratio state corresponding to the first operating position to a second ratio state corresponding to the second operating position, the method comprising the steps of:

detecting a first predetermined operating variable indicative of a power demand imposed on the accelerator by the driver and generating a power demand indicative signal indicative of said first predetermined operating variable detected;

detecting an actual value of a second predetermined operating variable and generating an actual value indicative signal indicative of said actual value detected;

setting a target value of said second predetermined operating variable in response to said power demand indicative signal;

determining a feedforward value in response to said target value;

determining a deviation between said actual value and said target value;

determining a feedback value in response to said deviation;

determining whether there has occurred a demand for downshift with power out of said power demand indicative signal;

setting a sum of said feedforward value and said feedback value as an output signal until occurrence of said demand; setting said feedforward value only as said output signal in response to said occurrence of said demand by neglecting said feedback value; and controlling the actuator in response to said output signal.

value in response to occurrence of said demand; and controlling the actuator in response to said output signal.

According to another aspect of the present invention, there is provided a system for controlling a reduction ratio in a continuously variable transmission drivingly connected to an engine of a vehicle having an accelerator manually operable by a driver of the vehicle, the continuously variable transmission having an actuator movable from a first operating position to a second operating position and hydraulic means for varying the reduction ratio from a first ratio state corresponding to the first operating position to a second ratio state corresponding to the second operating position, the system comprising: means for detecting a first predetermined operating variable indicative of a power demand imposed on the accelerator by the driver and generating a power demand indicative signal indicative of said first predetermined operating variable detected; means for detecting an actual value of a second predetermined operating variable and generating an actual value indicative signal indicative of said actual value detected; and a control unit comprising means for setting a target value of said second predetermined operating variable in response to said power demand indicative signal; means for determining a feedforward value in response to said target value; means for determining a deviation between said actual value and said target value; means for determining a feedback value in response to said deviation; means for determining whether there has occurred a demand for downshift with power out of said power demand indicative signal; means for determining a feedback value in response to said deviation; means for determining whether there has occurred a demand for downshift with power out of said power demand indicative signal; means for setting a sum of said feedforward value only and said feedback value as an output signal until occurrence of said demand; means for setting said feedforward value only as said output signal in response to said occurrence of said demand by neglecting said feedback value; and means for controlling the actuator in response to said output signal.

BRIEF DESCRIPTION OF THE DRAWINGS

FIG. 3 is a block diagram of a control unit of the control system;

DETAILED DESCRIPTION OF THE INVENTION

Referring to FIGS. 1, 2A, 2B, and 3, reference is made to copending U.S. patent application Ser. No. 07/563,309 filed on Aug. 7, 1990, now U.S. Pat. No. 5,067,372 issued on Nov. 26, 1991 to applicant, which application is hereby incorporating by reference in its entirety.

Figure 1:
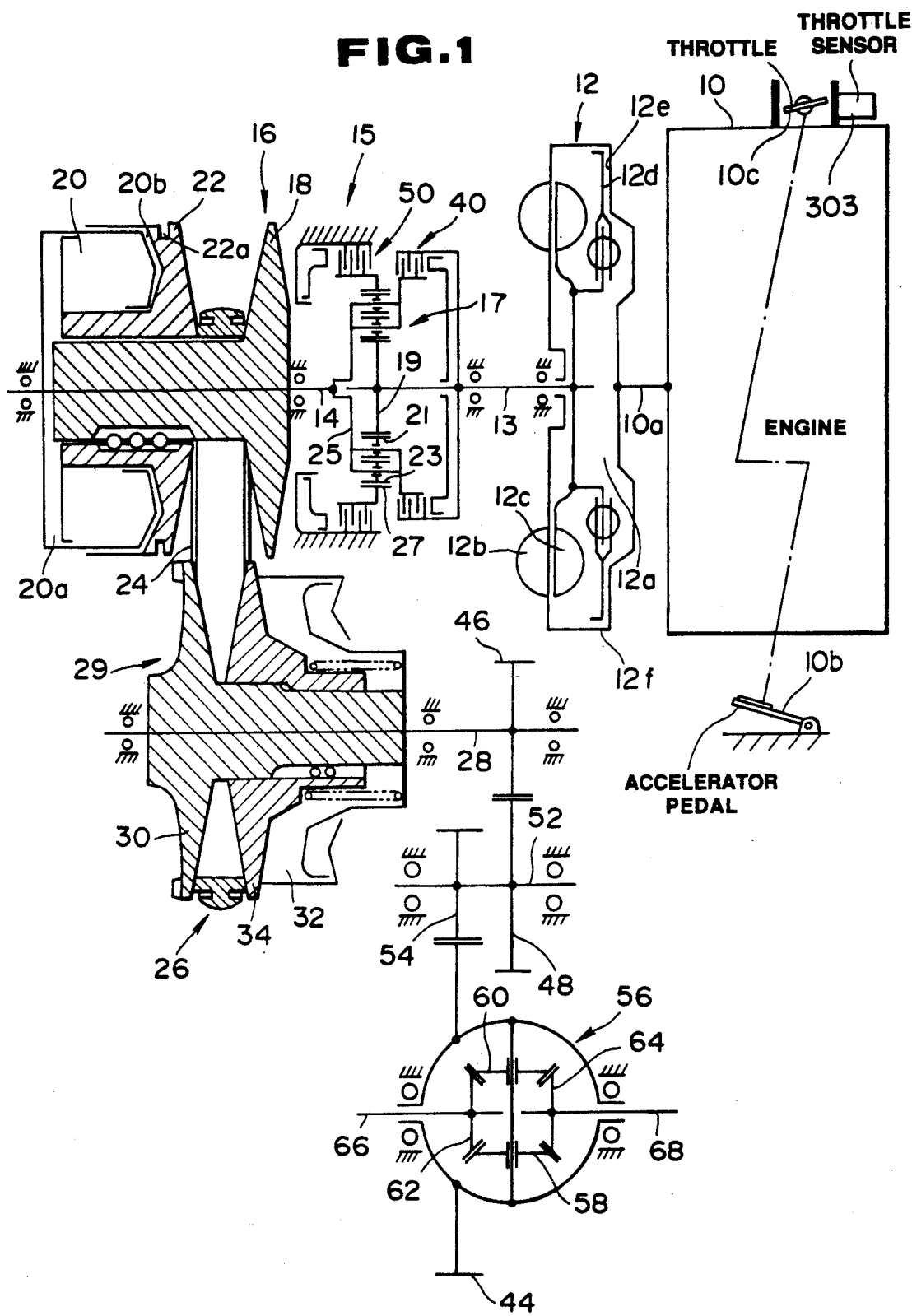
FIG. 1 is a schematic view of an automotive vehicle having an engine followed by a continuously variable transmission.

Referring to FIG. 1, there is shown a portion of an automotive vehicle having an engine 10 with a throttle 10c which opens in degrees as an accelerator pedal 10b is depressed. The accelerator pedal 10b is manually operable by a driver and thus indicative of the driver's power demand. An output shaft 10a of the engine is coupled with a hydrokinetic torque transmitting unit in the form of a fluid coupling 12. The fluid coupling 12 includes a lock-up mechanism which is hydraulically operated and has a lock-up state where a pump impeller 12b, i.e., an input element, is mechanically connected with a turbine runner 12c, i.e., an output element, and a release state where the former is fluidly connected with the latter by controlling the direction in the supply of hydraulic fluid to the inside of fluid coupling 12 so as to drain a lock-up chamber 12a or induces a pressure build-up therein. The lock-up mechanism includes a friction clutch element 12d rotatable with the turbine runner 12c. The clutch element 12d divides the inside of the fluid coupling 12 into two chambers, including the lock-up fluid chamber 12a, on the opposite sides thereof. When it is in a position as illustrated in FIG. 1, the clutch element 12d is disengaged from the adjacent end wall 12e rotatable with the pump impeller 12b. This illustrated position is established when a hydraulic fluid is supplied to the lock-up chamber 12a. The hydraulic fluid is then allowed to pass through a clearance 12f formed around the outer periphery of the clutch element 12d to flow into the inside of the fluid coupling 12, i.e., a torous circuit formed by the pump impeller 12b and the turbine runner 12c. When the hydraulic fluid is discharged from the lock-up chamber 12a and hydraulic fluid is supplied directly into the inside of the fluid coupling 12, there occurs a pressure difference across the clutch element 12d urging same into firm engagement with the adjacent wall 12e. The output element of the fluid coupling 12 is coupled with a turbine shaft 13. The turbine shaft 13 is coupled with a forward/reverse drive change-over mechanism 15. The forward/reverse drive change-over mechanism 15 has a planetary gearing 17, a forward clutch 40, and a reverse brake 50. The planetary gearing 17 comprises a sun gear 19, a pinion carrier 25 having a plurality sets of pinions, each including two pinion gears 21, 23, and a ring gear 27. The two pinion gears 21, 23 of each set are intermeshed and operatively disposed between the sun gear 19 and the ring gear 27 such that the pinion gear 21 meshes with the sun gear 19, and the pinion gear 23 meshes with the ring gear 27. The sun gear 19 is coupled with the turbine shaft 13 for unitary rotation therewith. The pinion carrier 25 is selectively coupled with the turbine shaft 13 via the forward clutch 40. The ring gear 27 is selectively held to a stationary portion via the reverse brake 50. The pinion carrier 25 is coupled with a driver shaft 14 arranged coaxially with the turbine shaft 13. Mounted on the driver shaft 14 is a driver pulley 16. The driver pulley 16 comprises an axially stationary conical disk (pulley element) 18, and an axially movable conical disk (pulley element) 22 that is arranged in opposed relationship with the axially stationary conical disk 18 so as to define a V-shaped pulley groove therebetween and displaceable in an axial direction of the driver shaft 14 under the bias of hydraulic fluid pressure applied to a driver pulley cylinder chamber 20 (servo chamber). The driver pulley cylinder chamber 20 comprises two chambers 20a and 20b, and has a pressure acting area twice as large as a pressure acting area of a later described follower pulley cylinder chamber 32 (servo chamber). The driver pulley 16 is drivingly connected to a follower pulley 26 via a V-belt 24. The follower pulley 26 is mounted on a follower shaft 28. The follower pulley 26 comprises an axially stationary conical disk 30 rotatable with the follower shaft 28, and an axially movable conical disk 34 that is arranged in opposed relationship with the axially stationary conical disk 30 so as to define a V-shaped pulley groove and displaceable in an axial direction of the follower shaft 28 under the bias of a hydraulic fluid pressure applied to a follower pulley cylinder chamber 32. Fixedly connected to the follower shaft 28 is a driver gear 46, which is in mesh with an idler gear 48 rotatable with an idler shaft 52. The idler shaft 52 has a pinion gear 54 rotatable therewith, the pinion gear 54 being in mesh with a final gear 44. A pair of pinion gears 58 and 60 of a differential 56 are connected to the final gear 44 for rotation therewith. The pinion gears 58, 60 are in mesh with a pair of side gears 62, 64, respectively, which are coupled with a pair of drive axles 66, 68, respectively.

A torque of the engine 10 is supplied via the fluid coupling 12 and the turbine shaft 13 to the forward/reverse drive change-over mechanism 15. When the forward clutch 40 is engaged with the reverse brake 50 released, the torque of the turbine shaft 13 is supplied to the driver shaft 14 via the planetary gearing 17, whereas when the forward clutch 40 is released with the reverse brake 50 engaged, the planetary gearing 17 acts to change the direction of the torque supplied to the driver shaft 14. From the driver shaft 14, the torque is transmitted via the driver pulley 16, V-belt 24, follower pulley 26, follower shaft 28, driver gear 46, idler gear 48, idler shaft 52, pinion gear 54, and final gear 44 to the differential 56. The differential 56 drives the drive axles 66, 68 in a forward or a reverse direction. It is to be noted that the neutral is established when both of the forward clutch 40 and reverse brake 50 are released. A speed ratio between the driver pulley 16 and follower pulley 26 is variable by varying the contact radius of the driver pulley 16 with the V-belt 24 and that of the follower pulley 26 with the V-belt 24. The contact radii are variable by an axial displacement of the axially movable conical disk 22 of the driver pulley 16 and the axial displacement of the movable conical disk 34 of the follower pulley 26. For example, if the width of the V-shaped pulley groove of the driver pulley 16 increases and the width of V-shaped pulley groove of the follower pulley 26 decreases, the contact radius of the driver pulley 16 with the V-belt 24 decreases whereas that of follower pulley 26 with the V-belt 24 increases. This results in an increase in reduction ratio. If the axially movable conical disks 22 and 34 are displaced in the opposite directions, a reduction ratio decreases.

Figure 2A:
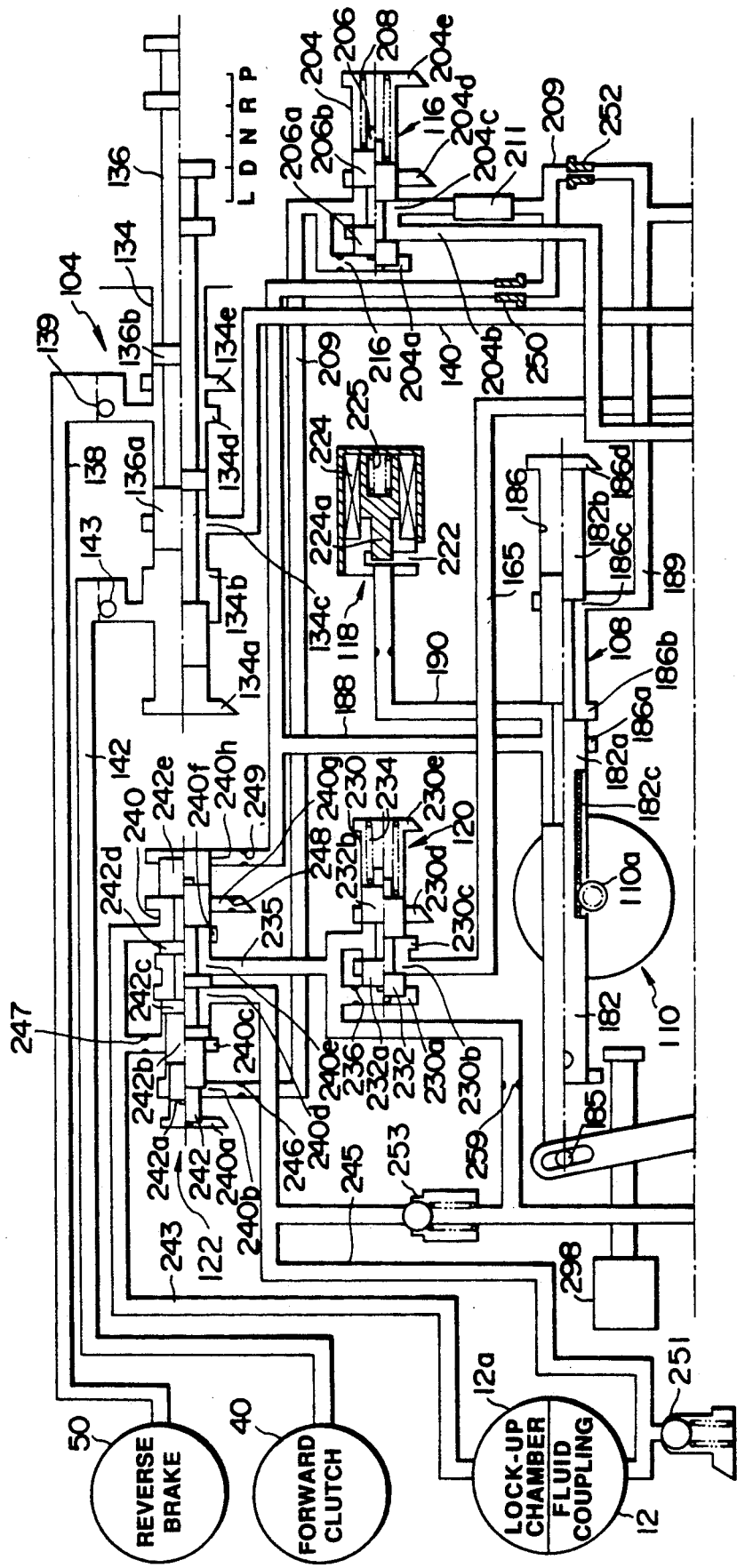
FIGS. 2A and 2B, when combined, illustrate an electro-hydraulic circuit of a control system for the transmission.
Figure 2B:
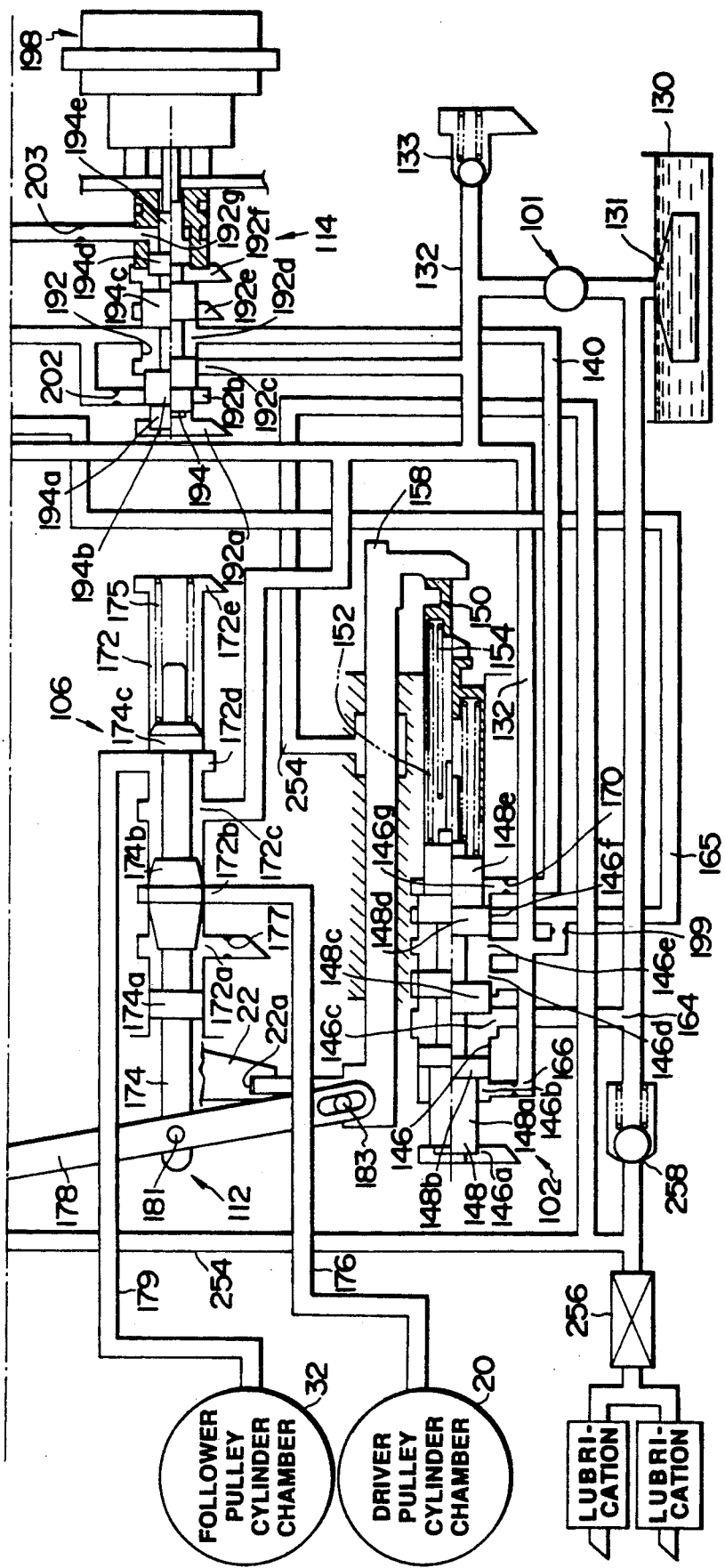

Referring to FIGS. 2A and 2B, a control system for the continuously variable transmission is described. As shown in FIGS. 2A and 2B, the control system comprises a hydraulic fluid pump 101, a line pressure regulator valve 102, a manual valve 104, a shift control valve 106, a shift command valve 108, a shift motor in the form of a stepper motor 110, a shift operation mechanism 112, a throttle valve 114, a constant pressure regulator valve 116, an electromagnetically operated valve 118, a coupling pressure regulator valve 120, and a lock-up control valve 122.

The pump 101 draws in hydraulic fluid from a tank 130 via a strainer 131, and discharges it into a hydraulic fluid line 132. Via the hydraulic fluid line 132, the discharged fluid is supplied to ports 146b, 146d and 146e of the line pressure regulator valve 102 where pressure regulation is effected to generate a hydraulic fluid pressure, i.e., a line pressure. The line pressure builds up in the hydraulic fluid line 132 which communicates with a port 192c of the throttle valve 114 and also with a port 172c of the shift control valve 106. It communicates also with a port 204b of the constant pressure regulator valve 116. Provided in the hydraulic fluid line 132 is a line pressure relief valve 133 for preventing abnormal increase in the line pressure.

The manual valve 104 has formed within a valve body a valve bore 134 having five ports 134a, 134b, 134c, 134d, and 134e, and a spool 136 having two lands 136a and 136b. The spool 136 is slidable by manipulation of a selector lever (not shown) to five detent positions, namely P, R, N, D, and L. The ports 134a and 134e are drain ports. The port 134b communicates with the forward clutch 40 via a hydraulic fluid line 142. The hydraulic fluid line 142 is provided with a one-way orifice 143 that provides a throttling effect to a supply of hydraulic fluid to the forward clutch 40. The port 134c communicates via a hydraulic fluid line 140 with ports 192b and 192d of the throttle valve 114. The port 134d communicates via a hydraulic fluid line 138 with the reverse brake 50. The hydraulic fluid line 138 is provided with a one-way orifice 139 that provides a throttling effect to a supply of hydraulic fluid to the reverse brake 50. When the spool 136 assumes the P position, the land 136a closes the land 134c that is subject to a throttle pressure within the hydraulic fluid line 140 generated by the throttle valve 114. The forward clutch 40 is drained via the hydraulic fluid line 142 and the drain port 134a of valve bore 134, and the reverse brake 50 is drained via the hydraulic fluid line 138 and the drain port 134e. When the spool 136 assumes the R position, the ports 134c and 134d are allowed to communicate with each other via a space within the valve bore defined between the lands 136a and 136b, and thus the reverse brake 50 is supplied with the throttle pressure from the hydraulic fluid line 140, whereas the forward clutch 40 is drained via the drain port 134a. When the spool 136 assumes the N position, the lands 136a and 136b prevent the port 134c from communicating with the other ports, and the ports 134b and 134d are drained. Thus, the reverse brake 50 and the forward clutch 40 are both drained. When the spool 136 assumes the D or L position, the ports 134b and 134c are allowed to communicate with each other via a space within the valve bore defined between the lands 136a and 136b, allowing supply of the throttle pressure to the forward clutch 40, whereas the reverse brake 50 is drained via the port 134e.

The line pressure regulator valve 102 has formed within the valve body a valve bore 146 having seven ports 146a, 146b, 146c, 146d, 146e, 146f, and 146g, a spool 148 having five lands 148a, 148b, 148c, 148d, and 148e, a sleeve 150 axially slidable within the valve bore 146, and two coaxially arranged springs 152 and 154 disposed between the spool 148 and the sleeve 150. The sleeve 150 is in abutting engagement with a bias member 158 and movable to the left as viewed in FIG. 2B in response to the leftward movement of the bias member 158. The bias member 158 is mounted within the valve body in parallel to the axis of the valve bore 146, and it has an opposite end portion formed with an integral arm snugly fit in a circumferential groove 22a with which the axially movable conical disk 22 of the driver pulley 16 is formed. Arrangement is such that an increase in reduction ratio causes movement of the sleeve 150 to the left as viewed in FIG. 2B, whereas a decrease in reduction ratio causes movement of the sleeve 150 to the right as viewed in FIG. 2B. Among the two springs 152 and 154, the outer spring 152 has opposite ends thereof always engaged by the sleeve 150 and the spool 148 and thus it is always compressed, whereas the inner spring 154 is not compressed until the sleeve 150 moves to the left as viewed in FIG. 2B by a predetermined distance from a position indicated by the upper half thereof. The port 146a of the line pressure regulator valve 102 is a drain port. The port 146g is supplied with the throttle pressure from the hydraulic fluid line 140. The port 146c communicates with the hydraulic fluid line 164 that serves as a drain line. The ports 146b, 146d, and 146e communicate with the hydraulic fluid line 132. The port 146f communicates via a hydraulic fluid line 165 with a port 230b of the coupling pressure regulator valve 120. This hydraulic fluid line 165 communicates with the hydraulic fluid line 132 via an orifice 199. The ports 146b and 146g are provided with orifices 166 and 170, respectively. The spool 148 of the line pressure regulator valve 102 is subject to two forces directed to the left as viewed in FIG. 2B, one due to spring 152 alone (or both of springs 152 and 154) and the other resulting from the fact that the throttle pressure acts via the port 146g on a differential area between the lands 148d and 148e, and it is also subject to a force directed to the right as viewed in FIG. 2B resulting from the fact that the line pressure acts via the port 146b on a differential area between the lands 148a and 148b. Thus, the spool 148 adjusts the amount of drainage of hydraulic fluid from the port 146d toward the port 146c until an equilibrium state is established where the above mentioned forces directed to the left and to the right balance with each other. As a result, the line pressure increases as the reduction ratio increases, and it also increases in response to an increase in the throttle pressure applied to the port 146g.

The shift control valve 106 has formed within the valve body a valve bore 172 having five ports 172a, 172b, 172c, 172d, and 172e, and a spool 174 having three lands 174a, 174b, and 174c, and a spring 175 biasing the spool 174 to the left as viewed in FIG. 2B. The port 172b communicates via a hydraulic fluid line 176 with the driver pulley cylinder chamber 20, and the ports 172a and 172e are drain ports. The port 172a is provided with an orifice 177. The port 172d communicates via a hydraulic fluid line 179 with the follower pulley cylinder chamber 32. The port 172c communicates with the hydraulic fluid line 132, and it is supplied with the line pressure. The spool 174 has its lefthand end, viewing in FIG. 2B, pivoted by a pin 181 to a lever 178 of the shift operation mechanism 112 at a generally middle portion thereof. Because the land 174b has an axial cross sectional configuration defined by a curved boundary, the hydraulic fluid supplied to the port 172c under the line pressure mainly flows into the port 172b, but it is partially discharged out of the port 172a. As a result, the magnitude of the hydraulic pressure developed in port 172b is determined by the ratio of amount of incoming flow to amount of discharging flow. Thus, leftward movement of the spool 174 causes an increase in clearance disposed on the discharge side and a decrease in clearance disposed on the line pressure side, resulting in an increase in hydraulic pressure developed in port 172b. The port 172d communicating with the follower pulley cylinder chamber 32 is always supplied with the line pressure from the port 172c. The hydraulic pressure at the port 172b is supplied via the hydraulic fluid line 176 to the driver pulley cylinder chamber 20, whereas the hydraulic pressure at the port 172d is supplied via the hydraulic fluid line 179 to the follower pulley cylinder chamber 32. As a result, the leftward movement of the spool 174, viewing in FIG. 2B, causes an increase in hydraulic pressure in the driver pulley cylinder chamber 20, causing a decrease in width of the V-shaped pulley groove of the driver pulley 16. That is, this causes an increase in contact radius of the driver pulley 16 with the V-belt 24, and a decrease in contact radius of the follower pulley 26 with the V-belt 24, causing a decrease in reduction ratio. Rightward movement of the spool 174, viewing in FIG. 2B, causes the reverse process to take place, causing an increase in reduction ratio.

Although, as mentioned before, the lever 178 of the shift operation mechanism 112 has the middle portion thereof connected to the spool 174 by the pin 181 and one end connected to the before mentioned bias member 158 by the pin 183. The opposite end of the lever 178 is connected to a spool 182 of a shift command valve 108 via a pin 185. The spool 182 is formed with a rack 182c that meshes with a pinion gear 110a of the shift motor 110. With this shift operation mechanism 112, if the pinion gear 110a of the shift motor 110 that is subject to control of a shift control unit 300 turns in such a direction as to cause the spool 182 to move to the right as viewed in FIG. 2A, this rightward movement of the spool 182 causes the lever 178 to swing about the pin 183 clockwise, thus urging the spool 174 of the shift control valve 106 to move to the right. As described previously, this causes the axially movable conical disc 22 of the driver pulley 16 to move to the left as viewed in FIG. 2B, resulting in an increase in reduction ratio. Because the one end of the lever 178 is linked to the bias member 158 via the pin 183, the above mentioned movement of the axially movable conical disk 22 causes the bias member 158 to move to the left as viewed in FIG. 2B. This leftward movement of the bias member 158 causes the lever 178 to swing about the pin 185 disposed on the other end thereof clockwise. Thus, the spool 174 is pulled back to the left, as viewed in FIG. 2B, tending to cause a decrease in reduction ratio. Through this process, the spool 174, driver pulley 16, and follower pulley 26 assume a stable state providing a reduction ratio corresponding to the position which the shift motor 110 has turned to. If the shift motor 110 turns in the opposite direction so as to urge the spool 182 of the shift command valve 106 to the left, as viewed in FIG. 2A, this leftward movement of the spool 182 causes the associated members to move in a similar manner until they assume another stable state providing another reduction ratio corresponding to a new position which the shift motor 110 has turned to.

The spool 182 of the shift command valve 108 is movable within a normal stroke range between a minimum reduction ratio position and a maximum reduction ratio position and also movable within the next adjacent overstroke range. When the spool 182 assumes the minimum reduction ratio position as indicated by the upper half thereof viewing in FIG. 2A, the spool 174 of the shift control valve 106, driver pulley 16, and follower pulley 26 assume a stable state providing the minimum reduction ratio in the continuously variable transmission. Rightward movement of the spool 182, viewing in FIG. 2A, from this minimum reduction ratio position causes the reduction ratio established in the continuously variable transmission to continuously vary toward the maximum reduction ratio. When the spool 182 assumes the maximum reduction ratio position, the spool 174 of the shift control valve 106, driver pulley 16, and follower pulley 26 assume a stable state providing the maximum reduction ratio in the continuously variable transmission. The spool 182 of the shift command valve 108 is movable beyond the maximum reduction ratio position into the overstroke range as indicated by the lower half thereof viewing in FIG. 2A. This movement of the spool 182 into the overstroke range turns on a change-over detection switch 298. This change-over detection switch 298 is left turned on as long as the spool 182 is movable within the overstroke range. The reduction ratio established in the continuously variable transmission is kept at the maximum reduction ratio during movement of the spool 182 within the overstroke range.

The shift motor 110 (which will be hereinafter called as "stepper motor") is so controlled as to assume a position that is determined by a target pulse number determined in a shift control unit 300.

The shift command valve 108 has formed within the valve body a valve bore 186 having ports 186a, 186b, 186c, and 186d, and the spool 182 formed with two axially spaced lands 182a and 182b. The port 186a communicates with a hydraulic fluid line 188. The port 186b communicates with the electromagnetically operated valve 118 via a hydraulic fluid line 190. The port 186c communicates with a hydraulic fluid line 189. The port 186d is a drain port. During movement of the spool 182 within the normal stroke range, the ports 186a and 186b are allowed to communicate with each other via a space defined within the valve bore between the lands 182a and 182b, but during movement of the spool 182 within the overstroke range, the port 186a is closed and the port 186b is allowed to communicate with the port 186c.

The throttle valve bore 114 has formed within the valve body a valve bore 192 having ports 192a, 192b, 192c, 192d, 192e, 192f, and 192g, a spool 194 having five lands 194a, 194b, 194c, 194d, and 194e, and a vacuum diaphragm 198 biasing the spool 194. When the intake manifold vacuum is lower than a predetermined value, for example, 300 mmHg, (viz., when intake manifold vacuum is near the atmospheric level), the vacuum diaphragm 198 biases the spool 194 with a force that is in inverse proportion to the magnitude of the intake manifold vacuum, whereas when the intake manifold vacuum is higher than the predetermined value, it applies no force to spool 194. The port 192a is a drain port, the ports 192b and 192d communicate with the hydraulic fluid line 140, the port 192c communicates with the hydraulic fluid line 132, and the port 192g communicates with the hydraulic fluid line 189. The ports 192b and 192g are provided with orifices 202 and 203, respectively. The spool 194 is subject to two forces directed to the left as viewed in FIG. 2B, one resulting from the fact that the hydraulic fluid pressure acts via the port 192g on a differential area between the lands 194d and 194e and the other by the vacuum diaphragm 198, and it is also subject to a force, directed to the right as viewed in FIG. 2B, resulting from the fact that the hydraulic fluid pressure acts via the port 192b on a differential area between the lands 194a and 194b. The throttle valve 114 effects a pressure regulation until the above mentioned forces balance with each other. During this pressure regulation, the line pressure applied to the port 192c is used as a pressure source. As a result, the throttle valve 114 generates a throttle pressure at the ports 192b and 192d. The throttle pressure is variable in response to the engine intake manifold vacuum. The throttle pressure is also variable with a hydraulic fluid pressure applied to the port 192g. This hydraulic fluid pressure is as high as a constant hydraulic fluid pressure generated by the constant pressure regulator valve 116 during movement of the spool 182 within the normal stroke range since the hydraulic fluid line 189 is disconnected from the electromagnetically operated valve 118. During movement of the spool 182 within the overstroke range, the hydraulic fluid line 189 is connected to the electromagnetically operated valve 118. Under this condition, the magnitude of the hydraulic fluid pressure applied to the port 192g is adjusted by the electromagnetically operated valve 118.

The constant pressure regulator valve 116 has formed within the valve body a valve bore 204 having ports 204a, 204b, 204c, 204d, and 204e, a spool 206 having lands 206a and 206b, and a spring 208 biasing the spool 206 to the left as viewed in FIG. 2A. The ports 204a and 204c communicate with a hydraulic fluid line 209. The port 204b communicates with the hydraulic fluid line 132. The ports 204d and 204e are drain ports. The port 204a is provided with an orifice 216. The constant pressure regulator valve 116 generates a constant pressure corresponding to the force of the spring 208. The constant hydraulic fluid pressure is supplied to the hydraulic fluid line 209. The hydraulic fluid line 209 communicates via a choke type throttle valve 250 with the hydraulic fluid line 188 and via a choke type throttle valve 252 with the hydraulic fluid line 189. The hydraulic fluid line 209 is provided with a filter 211.

The electromagnetically operated valve 118 is so constructed as to adjust the discharge, in amount, of hydraulic fluid from a hydraulic fluid line 190 to a port 222 and includes a plunger 224a biased by a spring 225 toward a closed postion where the discharge is prohibited under the control of a solenoid 224. The solenoid 224 is subject to a pulse duty factor control by the shift control unit 300. The amount of hydraulic fluid discharged is in inverse proportion to the flow of current passing through the solenoid 224.

The coupling pressure regulator valve 120 has formed within the valve body a valve bore 230 having ports 230a, 230b, 230c, 230d and 230e, a spool 232 having lands 232a and 232b, and a spring 234 biasing the spool 232 to the left as viewed in FIG. 2A. The ports 230a and 230c communicate with a hydraulic fluid line 235. The port 230b is supplied with hydraulic fluid discharged by the line pressure regulator valve 102 through the hydraulic fluid line 165. The ports 230d and 230e are drain ports. The port 230a is provided with an orifice 236. The coupling pressure regulator valve 120 effects pressure regulation using the hydraulic fluid pressure applied to port 230b as a source of hydraulic pressure and generates a constant hydraulic fluid pressure corresponding to the force of the spring 234. This hydraulic fluid pressure is supplied to the hydraulic fluid line 235. This hydraulic fluid pressure is used as a working pressure within the fluid coupling 12, and it is also used to actuate the lock-up mechanism.

The lock-up control valve 122 has formed within the valve body a valve bore 240 having ports 240a, 240b, 240c, 240d, 240e, 240f, 240g, and 240h, and a spool 242 having lands 242a, 242b, 242c, 242d, and 242e. The ports 240a and 240g are drain ports. The port 240b communicates with the hydraulic fluid line 209. The ports 240c and 240f communicate via a hydraulic fluid line 243 with the lock-up chamber 12a, the port 240d communicates with a hydraulic fluid line 245 which in turn communicates with the fluid coupling 12. The port 240e is supplied with the constant pressure from the hydraulic fluid line 235. The port 240h communicates with the hydraulic fluid line 188. The ports 240b, 240c, 240g, and 240h are provided with orifices 246, 247, 248, and 249, respectively. The spool 242 is movable between a lock-up position and a lock-up release position and subject to the following three forces, one due to the constant hydraulic fluid pressure, generated by the constant pressure regulator valve 116, acting via the port 240b on the differential area between the lands 242a and 242b, another due to the hydraulic fluid pressure acting via the port 240c on the differential area between the lands 242b and 242c, and the other due to the hydraulic fluid pressure adjusted by the electromagnetically operated valve 118 and acting via the port 240h on the axial end of the land 242e. When the spool 242 assumes the lock-up position as indicated by the upper half thereof viewing in FIG. 2A, the port 240f is allowed to communicate with the port 240g via a space defined in the valve bore between the lands 242d and 242e, thus draining the lock-up chamber 12a via the port 240g. In this lock-up position, the port 240d is allowed to communicate with the port 240e via a space defined in the valve bore between the lands 242c and 242d, thus allowing the supply of the constant hydraulic pressure generated by the coupling pressure regulator valve 120 to the inside of the fluid coupling 12 via the hydraulic fluid line 245. As a result, the lock-up mechanism assumes the lock-up state. The hydraulic fluid line 245 is provided with a relief valve 251 for preventing abnormally high pressure build-up within the fluid coupling 12. When, on the other hand, the spool 242 assumes the lock-up release position as indicated by the lower half thereof viewing in FIG. 2A, the port 240e is allowed to communicate with the port 240f via a space defined within the valve bore between the lands 242d and 242e, thus allowing the supply of the constant hydraulic fluid pressure, generated by the coupling pressure regulator valve 120, to the lock-up chamber 12a via the hydraulic fluid line 243. In this position, the port 240d is sealed by the lands 242c and 242d. As a result, the lock-up mechanism assumes the lock-up release state. The hydraulic fluid pressure within the fluid coupling 12 is kept at a constant value by means of a pressure maintaining valve 253. The hydraulic fluid discharged by the pressure maintaining valve 253 flows via a hydraulic fluid line 254 to a cooler 256 where it is cooled before used for lubrication. The hydraulic fluid line 254 is provided with a cooler pressure maintaining valve 258. The hydraulic fluid discharged by the cooler pressure maintaining valve 258 returns via a hydraulic fluid line 164 to the tank 130. The hydraulic fluid line 254 extends to an area where the bias member 158 is slidably engaged with the valve body for lubrication purpose. The hydraulic fluid line 254 communicates via an orifice 259 with the hydraulic fluid line 235.

The stepper motor 110 and the solenoid 224 of the electromagnetically operated valve 118 are under the control of the control unit 300.

Referring to FIG. 3, the control unit 300 receives output signals of a plurality of sensors and switches which detect operating variables which the motor vehicle is involved in. The plurality of sensors and switches comprise an engine revolution speed sensor 301, a vehicle speed sensor 302, a throttle opening sensor 303, a shift position switch 304, a turbine revolution speed sensor 305, an engine coolant temperature senosr 306, a brake sensor 307 and, the change-over detection switch 298. The engine revolution speed sensor 301 detects an engine revolution speed by counting the number of engine ignition spark pulses. The vehicle speed sensor 302 detects a vehicle speed by measuring rotational speed of the output shaft of the continuously variable transmission. The throttle opening sensor 303 detects an opening degree of the throttle 10c. The shift position switch 304 detects which of different shift positions P, R, N, D, and L the manual valve 104 is placed at. The turbine revolution speed sensor 305 detects a revolution speed of the turbine shaft 13. The engine coolant temperature sensor 306 generates an output signal when the engine coolant temperature is lower than a predetermined value. The brake sensor 307 detects whether a foot brake is pressed or not. The change-over detection switch 298 is turned on when the spool 182 of the shift command valve 108 moves beyond the maximum reduction ratio position into the overstroke range. Output signals of the engine revolution speed sensor 301, vehicle speed sensor 302, and turbine revolution speed sensor 305 are supplied via the associated wave shapers 308, 309, and 322 to an input interface 311. Output signal of the throttle opening sensor 303 is converted into a digital signal at an AD converter 310 before being supplied to the input interface 311. Output signals of the shift position switch 304, engine coolant temperature sensor 306, brake sensor 307, and change-over detection switch 298, are supplied to the input interface 311. The shift control unit 300 is of a microcomputer based control unit and comprises the input interface 311, a CPU (central processor unit) 313, a reference pulse generator 312, a ROM (read only memory) 314 and a RAM (random access memory) 315, and an output interface 316. These elements are interconnected by an address bus 319 and a data bus 320. Reference pulse generator 312 generates a reference pulse on which the CPU 313 operates. The RAM 315 temporarily stores information from various sensors and switches and parameters necessary for control. Output signals of the shift control unit 300 is supplied via output interface 316 and an amplifier 317 to the stepper motor 110 and via output interface 316 to the solenoid 224.

Figure 5:
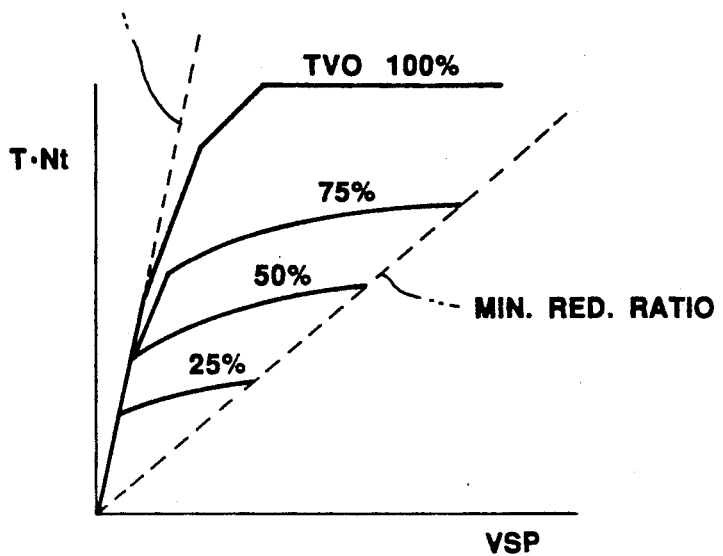
FIG. 5 is a graph showing a family of characteristic curves, each representing a desired variation of a target value in turbine revolution speed (T·Nt) against varying vehicle speeds (VSP) with one of different throttle opening degrees (TVO) for different TVO.
Figure 6:
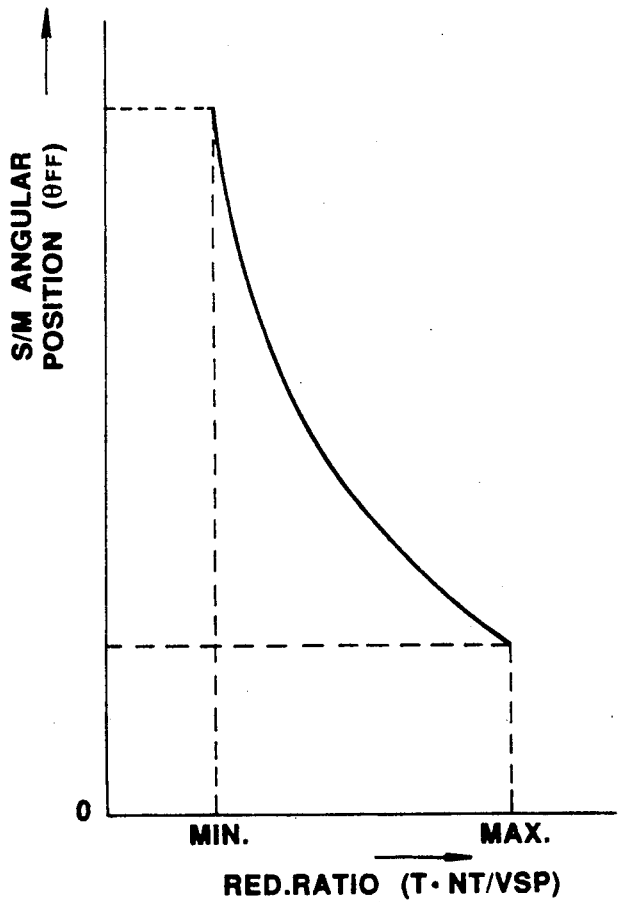
FIG. 6 is a graph showing the relationship between reduction ratio and angular position of a stepper motor.

Referring to FIGS. 5–8, the principle of operations of the invention are explained below. In FIG. 5, a family of fully drawn curves illustrates a mapping data, f(VSP, TVO), which is to be retrieved based on a throttle opening degree TVO and a vehicle speed VSP to give a target value in a turbine (or input) revolution speed T·Nt. In FIG. 5, a broken straight line MAX is drawn to interconnect operation points at which the maximum reduction ratio is kept established, while a broken straight line MIN is drawn to interconnect operation points at which the minimum reduction ratio is kept established. In FIG. 6, a fully drawn curve illustrates a mapping data, G(T·Nt/VSP), which is to be retrieved based on a target reduction ratio T·Nt/VSP to give an angular position of the stepper motor 110, i.e., a feedforward value $\theta_{FF}$. From FIG. 6, it is readily seen that a downshift in reduction ratio toward the maximum reduction ratio results from a corresponding decrease in angular position toward zero.

Figure 7:
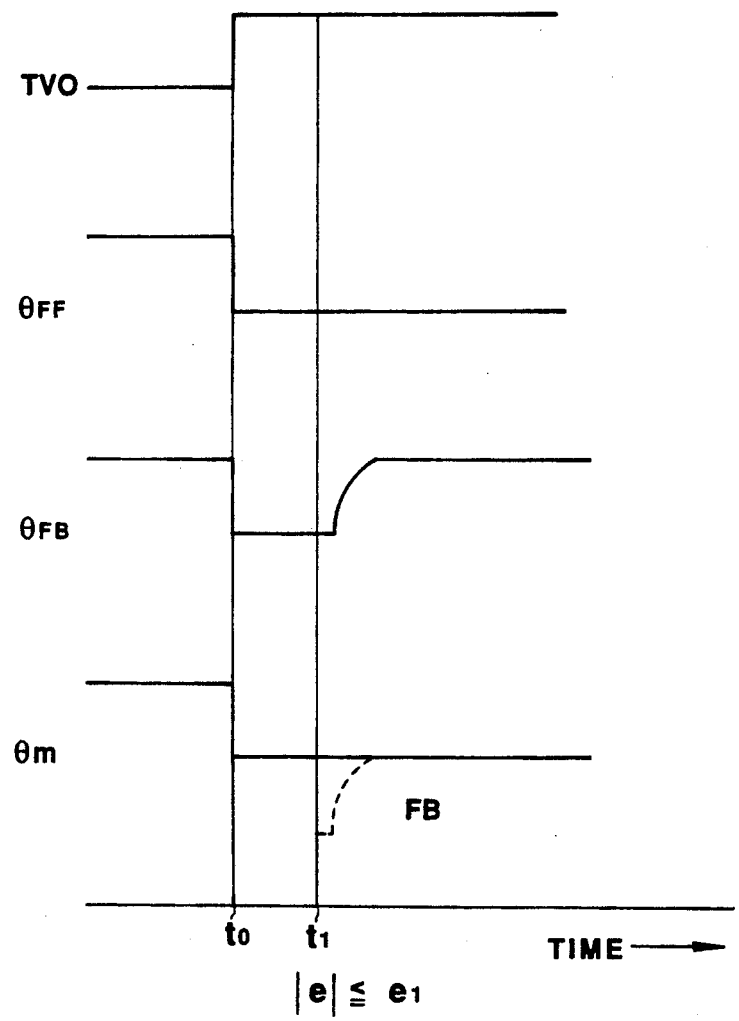
FIG. 7 is a signal timing diagram used to explain principle operations of the embodiment.

FIG. 7 is a signal timing diagram which has been drawn based on the assumption that, at a moment $t_0$, the accelerator pedal 10b is depressed, i.e., a command for downshift with power. At the moment $t_0$, the throttle opening degree TVO increases. This causes a decrease in angular position of the stepper motor 110. i.e., a feedforward value $\theta_{FF}$, since the increase in the throttle opening degree TVO causes an increase in the target value T·Nt which in turn causes a decrease in the feedforward value $\theta_{FF}$ as seen from FIGS. 5 and 6. At the moment $t_0$, there occurs a deviation in the turbine or input revolution speed, which deviation is given by subtraction of the target value T·Nt from an actual value Nt. Since the target value T·Nt increases at the moment $t_0$, the sign of the deviation e is minus. Thus, a feedback value $\theta_{FB}$ that is variable with the deviation e deflects toward minus at the moment $t_0$. At and after the moment $t_0$, if the absolute value of the deviation e is greater than a predetermined value $e_1$, the feedback value $\theta_{FB}$ is neglected and the feedforward value $\theta_{FF}$ only is used as an output signal $\theta m$. In response to this output signal $\theta m$, the stepper motor 110 is turned in such a direction as to cause a downshift. The turning of the stepper motor 110 causes an increase in reduction ratio established in the continuously variable transmission, causing an increase in the input revolution speed Nt. As the shift progresses, the absolute value of the deviation e decreases. Preferably, at a moment $t_1$ when the absolute value of the deviation e becomes equal to or less than the predetermined value $e_1$, the feedback value $\theta_{FB}$ is added to the feedforward value $\theta_{FF}$ and the sum of them is used as the output signal $\theta m$ as illustrated by a broken line drawn downward deflection as indicated by FB.

Figure 8:
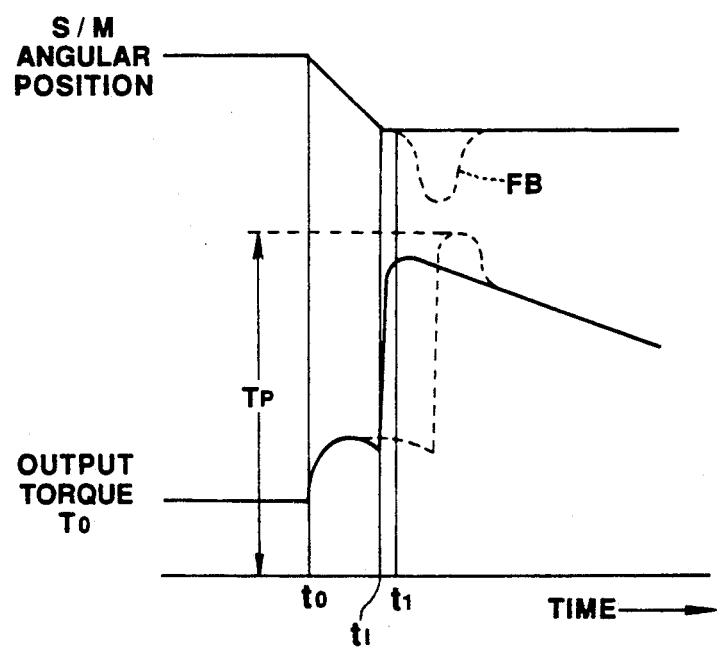
FIG. 8 is a stepper motor angular position and output torque timing diagram.

FIG. 8 shows in fully drawn curves a variation in output torque $T_O$ with varying angular position of the stepper motor 110 in response to the output signal $\theta m$, i.e., the feedforward value $\theta_{FF}$ only. Broken line drawn curves show a variation in output torque $T_O$ owing to an overshoot in downshift direction due to an addition of the feedback value $\theta_{FB}$ to the feedforward value $\theta_{FF}$ after the absolute value of the deviation e has become equal to or less than the predetermined value $e_1$. From the preceding explanation, it is now seen that the feedback value $\theta_{FB}$ is neglected after the command for downshift with power if the absolute value of the deviation e is greater than the predetermined value $e_1$. Since the feedback value $\theta_{FB}$ is neglected, a change in angular position of the stepper motor 110 in the downshift direction ceases at an early timing (at a moment $t_1$ in FIG. 8). As a result, the output torque $T_O$ rises at an early timing, too, since the output torque $T_O$ rapidly increase immediately after the moment $t_1$. The peak of the output torque $T_P$ increases owing to the overshoot FB after the moment $t_1$ when the absolute value of the deviation e has become equal to or less than the predetermined value $e_1$.

It will now be appreciated from the preceding description that an increase of the output torque $T_O$ takes place without any appreciable delay after a manual depression of the accelerator pedal 10b with an intention to effect a downshift with power.

Figure 4:
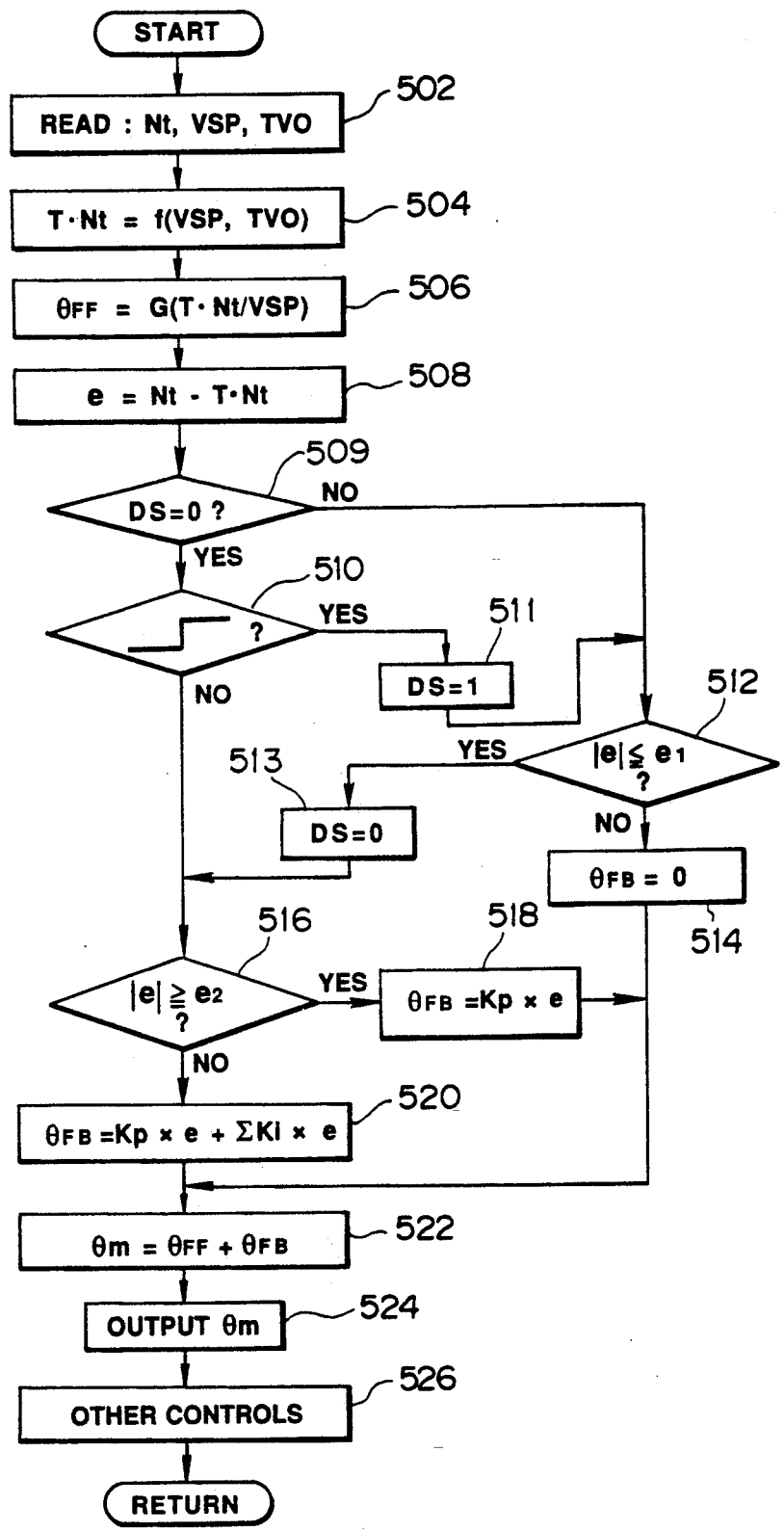
FIG. 4 is a flow diagram for explaining principle operations of an embodiment according to the present invention.

Referring to FIG. 4, the flow diagram of the above-mentioned operations is explained below.

In FIG. 4, at a step 502, reading operations of outputs of the turbine revolution speed sensor 305, vehicle speed sensor 302 and throttle opening degree sensor 303 are performed to give and store the results as a turbine (or an input) revolution speed Nt, a vehicle speed VSP and a throttle opening degree TVO. At the subsequent step 504, a table look-up operation of the mapping data, f(VSP, TVO), shown in FIG. 5 is performed based on the vehicle speed VSP and throttle opening degree TVO stored at the preceding step 502 to give a target value in turbine revolution speed T·Nt. This table look-up operation is followed by another table look-up operation, at a step 506, of the mapping data, G(T·Nt/VSP), based on a target reduction ratio determined by dividing the target value T·Nt by the vehicle speed VSP to give a feedforward value $\theta_{FF}$. At the next step 508, a deviation e is determined by calculating a subtraction of T·Nt from Nt. After this step 508, there is an interrogation 509 whether a downshift command flag DS is reset. If this is the case, there is an interrogation 510 whether there has occurred an increase in the throttle opening degree TVO. If this is the case, the downshift command flag DS is set at a step 511. This step 511 is followed by an interrogation 512 whether the absolute value of the deviation e is equal to or less than a first predetermined value $e_1$. If this is not the case, i.e., the absolute value of the deviation e is greater than the first predetermined value $e_1$, the routine proceeds from the interrogation 512 to a step 514. At the step 514, a feedback value $\theta_{FB}$ is set equal to zero. Then, the routine proceeds to a step 522 where the sum of the feedforward value $\theta_{FF}$ and the feedback value $\theta_{FB}$ is calculated to give the result as an output $\theta m$. The outputting of $\theta m$ is performed at the next step 524. After this step 524 and performing other processing or controls at a step 526, the routine returns to the initial point. In the next run, the routine proceeds along a flow 502, 504, 506, 508, 509, 512, 514, 522, 524 and 526, since the downshift flag DS is set and the absolute value of the deviation e is still greater than the predetermined value $e_1$. Thus, the stepper motor 110 is turned in the downshift direction in response to the output $\theta m$ which involves the feedforward value $\theta_{FF}$ only, since the feedback value $\theta_{FB}$ is set to zero at the step 514. As time passes, the absolute value of the deviation e decreases. In one of the succeeding runs, if the absolute value of the deviation e becomes equal to or less than the predetermined value $e_1$, the routine proceeds from the interrogation 512 to a step 513 where the downshift flag DS is reset. After this step 513, there is an interrogation 516 whether the absolute value of the deviation e is greater than or equal to a second predetermined value $e_2$ that is greater than the first predetermined value $e_1$. Since this is not the case, the routine proceeds to a step 520. At the step 520, a proportional term, which is expressed by Kp×e (where Kp: a constant) and an integral term, which is expressed by ΣKi×e (where Ki: a constant) are determined, and the sum of them is set as the feedback value $\theta_{FB}$. The proportional term is determined by the product of the proportional gain Kp and the deviation e, while the integral term is determined by the accumulation of the product of the integral gain Ki and the deviation e. After this step 520, the feedforward value $\theta_{FF}$ is increased by the addition of the feedback value $\theta_{FB}$ set at the step 520. This step 522 is followed by the steps 524 and 526.

In a stable operation or during a transition for upshift, the routine proceeds along a flow 502, 504, 506, 508, 509, 510 and 516. At the step 516, if the absolute value of the deviation e is equal to or greater than the predetermined value $e_2$, the proportional term is calculated and set as the feedback value $\theta_{FB}$ at a step 518. If the absolute value of the deviation e is less than the predetermined value $e_2$, the sum of the proportional and integral terms is set as the feedback value $\theta_{FB}$ at the step 520.

What is claimed is:

1. A method of controlling a reduction ratio in a continuously variable transmission drivingly connected to an engine of a vehicle having an accelerator manually operable by a driver of the vehicle, the continuously variable transmission having an actuator movable from a first operating position to a second operating postion and hydraulic means for varying the reduction ratio from a first ratio state corresponding to the first operating position to a second ratio state corresponding to the second operating position, the method comprising the steps of:

detecting a first predetermined operating variable indicative of a power demand imposed on the accelerator by the driver and generating a power demand indicative signal indicative of said first predetermined operating variable detected;

detecting an actual value of a second predetermined operating variable and generating an actual value indicative signal indicative of said actual value detected;

setting a target value of said second predetermined operating variable in response to said power demand indicative signal;

determining a feedforward value in response to said target value;

determining a deviation between said actual value and said target value;

determining a feedback value in response to said deviation;

determining whether there has occurred a demand for downshift with power from said power demand indicative signal;

setting, as an output signal, a sum of said feedforward value and said feedback value until occurrence of said demand;

setting as said output signal, said feedforward value only in response to said occurrence of said demand by neglecting said feedback value; and controlling the actuator in response to said output signal.

2. The method of claim 1, wherein said first predetermined operating variable is an opening degree of the engine throttle operatively associated with the accelerator.

3. The method of claim 1, wherein said second predetermined operating variable is a revolution speed of an input to the continuously variable transmission.

4. The method of claim 1, wherein said step of determining whether there has occurred said demand for downshift with power comprises the step of detecting an increase in said power demand indicative signal, the step of comparing the absolute value of said deviation with a predetermined value, the step of setting said demand for downshift with power when said absolute value of said deviation is greater than said predetermined value after detecting said increase in said power demand indicative signal.

5. The method of claim 4, further comprising the step of resetting said demand for downshift with power when said absolute value of said deviation is less than or equal to said predetermined value after detecting said increase in said power demand indicative signal.

6. A system for controlling a reduction ratio in a continuously variable transmission drivingly connected to an engine of a vehicle having an accelerator manually operable by a driver of the vehicle, the continuously variable transmission having an actuator movable from a first operating position to a second operating position and hydraulic means for varying the reduction ratio from a first ratio state corresponding to the first operating position to a second ratio state corresponding to the second operating position, the system comprising:
means for detecting a first predetermined operating variable indicative of a power demand imposed on the accelerator by the driver and generating a power demand indicative signal indicative of said first predetermined operating variable detected;
means for detecting an actual value of a second predetermined operating variable and generating an actual value indicative signal indicative of said actual value detected; and
a control unit comprising
means for setting a target value of said second predetermined operating variable in response to said power demand indicative signal;
means for determining a feedforward value in response to said target value;
means for determining a deviation between said actual value and said target value;
means for determining a feedback value in response to said deviation;
means for determining whether there has occurred a demand for downshift with power from said power demand indicative signal;
means for setting, as an output signal, a sum of said feedforward value and said feedback value until occurrence of said demand;
means for setting, as said output signal, said feedforward value only in response to said occurrence of said demand by neglecting said feedback value; and
means for controlling the actuator in response to said output signal.

7. The system of claim 6, wherein said first predetermined operating variable detecting means comprises a throttle opening degree sensor.

8. The system of claim 6, wherein said actual value detecting means comprises a turbine revolution speed sensor.

9. A method of controlling a reduction ratio in a continuously variable transmission drivingly connected to an engine of a vehicle having an accelerator manually operable by a driver of the vehicle, the continuously variable transmission having an actuator movable from a first operating position to a second operating position and hydraulic means for varying the reduction ratio from a first ratio state corresponding to the first operating position to a second ratio state corresponding to the second operating position, the method comprising the steps of:
detecting a first predetermined operating variable indicative of a power demand imposed on the accelerator by the driver and generating a power demand indicative signal indicative of said first predetermined operating variable detected;
detecting an actual value of a second predetermined operating variable and generating an actual value indicative signal indicative of said actual value detected;
setting a target value of said second predetermined operating variable in response to said power demand indicative signal;
determining a feedforward value in response to said target value;
determining a deviation between said actual value and said target value;
detecting an increase in said power demand indicative signal;
comparing the absolute value of said deviation with a first predetermined value;
setting a demand for downshift with power when, as a result of said comparing step of said deviation with said first predetermined value, said absolute value of said deviation is greater than said first predetermined value after detecting said increase in said power demand indicative signal;
resetting said demand for downshift with power when, as a result of said comparing step of said deviation with said first predetermined value, said absolute value of said deviation is less than or equal to said first predetermined value;
setting said feedforward value as an output signal when said demand for downshift with power is set;
comparing the absolute value of said deviation with a second predetermined value that is greater than said first predetermined value;
determining a first feedback value in response to said deviation when, as a result of said comparing step of comparing the absolute value of said deviation with said second predetermined value, the absolute value of said deviation is greater than or equal to said second predetermined value under a condition when said demand is reset;
determining a second feedback value when, as a result of said comparing step of said absolute value of said deviation with said second predetermined value, the absolute value of said deviation is less than said second predetermined value under the condition when said demand is reset;
setting a sum of said feedforward value and said first feedback value as said output signal when, as a result of said comparing step of comparing the absolute value of said deviation with said second predetermined value, the absolute value of said deviation is greater than or equal to said second predetermined value under a condition when said demand is reset;

setting a sum of said feedforward value and said second feedback value as said output signal when, as a result of said comparing step of said absolute value of said deviation with said second predetermined value, the absolute value of said deviation is less than said second predetermined value under the condition when said demand is rest; and controlling the actuator in response to said output signal.

* * * * *